C. FREDRIKSEN.
DIRECTION SIGNAL FOR VEHICLES.
APPLICATION FILED AUG. 22, 1917.

1,304,172.

Patented May 20, 1919.
3 SHEETS—SHEET 1.

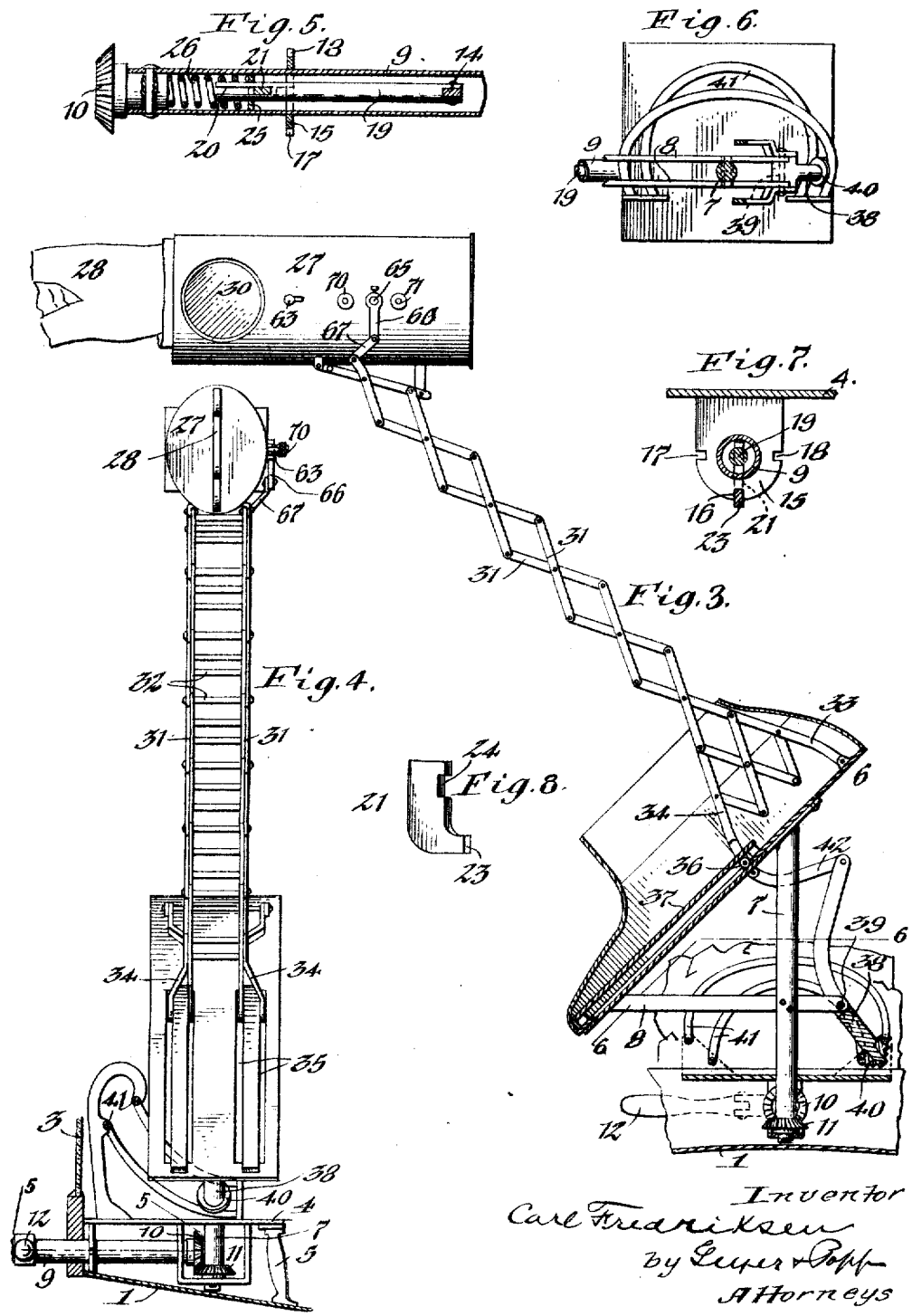

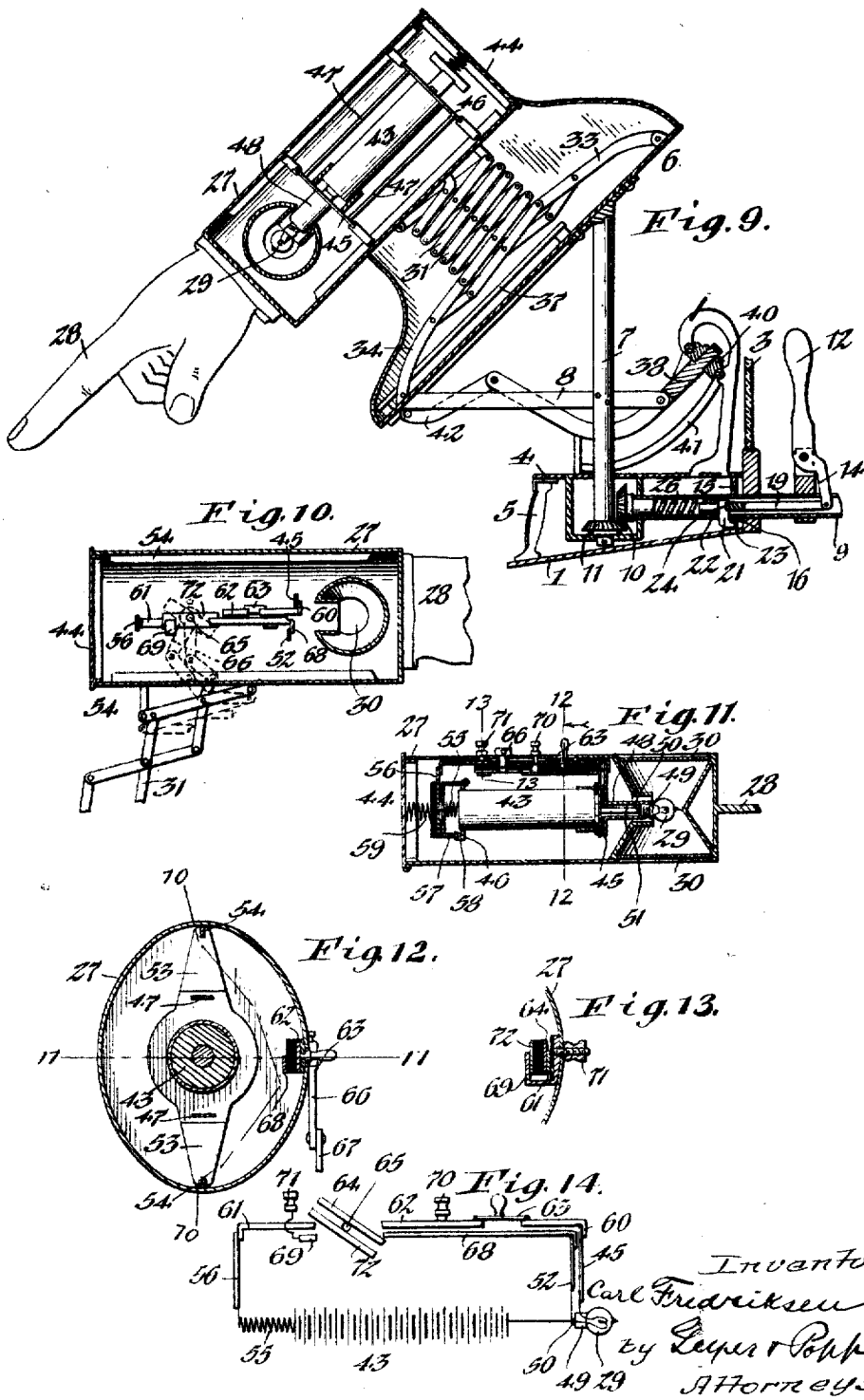

UNITED STATES PATENT OFFICE.

CARL FREDRIKSEN, OF LACKAWANNA, NEW YORK.

DIRECTION-SIGNAL FOR VEHICLES.

1,304,172.　　　　　　Specification of Letters Patent.　　　Patented May 20, 1919.

Application filed August 22, 1917. Serial No. 187,573.

*To all whom it may concern:*

Be it known that I, CARL FREDRIKSEN, a citizen of the United States, residing at Lackawanna, in the county of Erie and State of New York, have invented new and useful Improvements in Direction-Signals for Vehicles, of which the following is a specification.

This invention relates to direction signals for vehicles and more particularly to signals for use on automobiles so as to indicate to persons either in front or in rear of an automobile as to the particular course which the respective car is about to take.

It is the purpose of this invention to provide a signal of this character which is efficient in operation and capable of being readily shifted into different positions to indicate the course of the vehicle.

Figure 1:
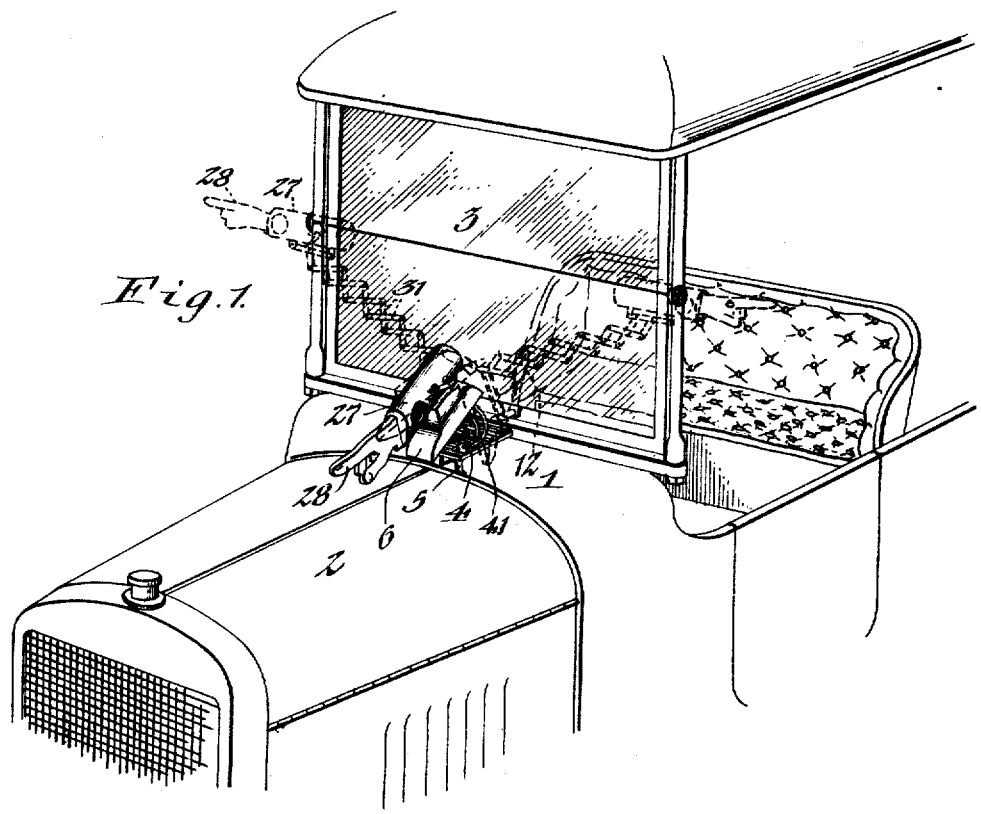
Figure 2:
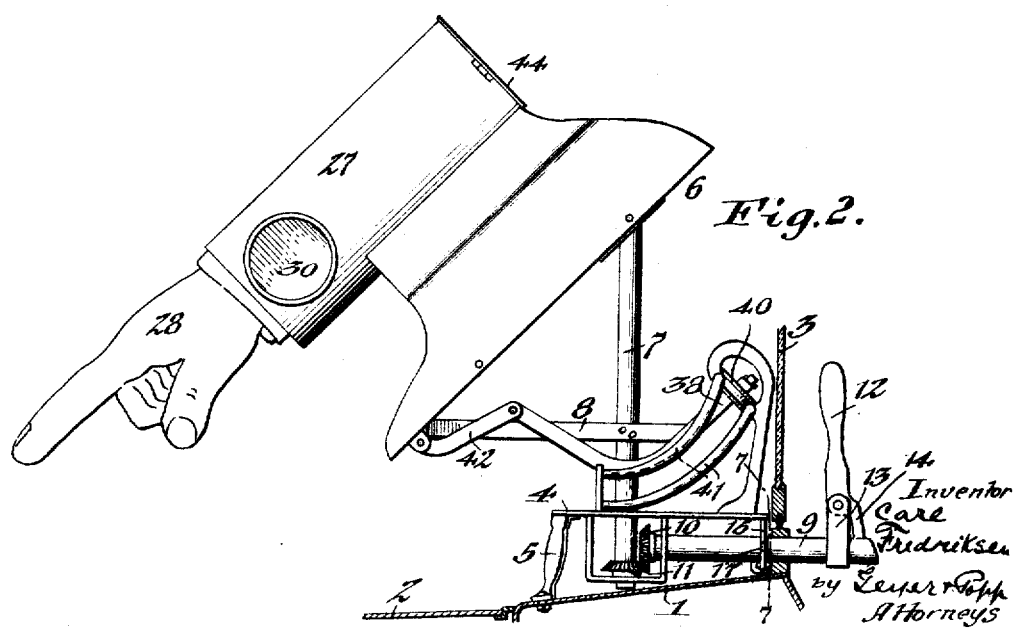

In the accompanying drawings:

Figure 1 is a fragmentary perspective view of an automobile equipped with a direction signal embodying my invention. Fig. 2 is a side elevation, partly in section, and on an enlarged scale, of this signal showing the same in its retracted position. Fig. 3 is a similar view showing the same projected toward one side of the car for indicating that the vehicle is about to turn in that direction. Fig. 4 is a front elevation, partly in section, of the direction signal. Fig. 5 is a fragmentary horizontal section, on an enlarged scale, taken on line 5—5, Fig. 4. Fig. 6 is a fragmentary horizontal section taken on line 6—6, Fig. 3. Fig. 7 is a fragmentary vertical transverse section, on an enlarged scale, taken on line 7—7, Fig. 2. Fig. 8 is a perspective view of the dog or latch of the locking mechanism whereby the turret may be locked either in its central or in either of its laterally-turned positions. Fig. 9 is a longitudinal section of the signal corresponding to Fig. 2. Fig. 10 is a fragmentary longitudinal section of the body of the indicator and adjacent parts showing the same in an operative position, the section being taken generally on line 10—10, Fig. 12. Fig. 11 is a longitudinal section of the indicating portion of the signal, on a reduced scale, taken on line 11—11, Fig. 12. Fig. 12 is a vertical transverse section, on an enlarged scale, taken on line 12—12, Fig. 11. Fig. 13 is a fragmentary transverse section taken on line 13—13, Fig.
11. Fig. 14 is a diagrammatic view showing the electric circuits of the signal.

Similar characters of reference indicate corresponding parts throughout the several views.

Although my improved signal may be mounted upon any suitable part of the automobile, it is preferably, as shown in the drawings mounted on the central upper part of the cowl 1 between the engine hood 2 and the wind shield 3. In its general organization, this signal comprises a base, a turret mounted on the base so as to be capable of turning horizontally and an indicator movably mounted on the turret so as to be capable of turning horizontally therewith and also projected therefrom for the purpose of giving a signal to persons either in front, in rear or at the side of the respective car and also retracted into its inoperative position.

The base may be of any suitable construction, but as shown in the drawings, the same preferably comprises a horizontal top plate or platform 4 which is provided on its underside with depending legs 5 secured to the upper side of the cowl by means of bolts, as shown or by any other appropriate means. The turret is mounted on this base so as to be capable of turning horizontally together with the indicator which is movably mounted on the turret. In its preferred form this turret comprises a hollow inclined body 6 which has an opening in its upper side and an upright shaft 7 secured at its upper end to the bottom of the turret body and journaled at its lower end in suitable bearings on the base. The front part of the turret body is preferably connected with the central part of the shaft 7 by means of two horizontal longitudinal bars or braces 8 which stiffen these parts relatively to each other and form part of the turret, as best shown in Figs. 2, 3, 6 and 9. Various means may be provided for turning this turret from a point adjacent to the driver's seat, the means for this purpose shown in the drawings comprising a horizontal longitudinal operating shaft 9 which is journaled in suitable bearings on the rear part of the base and connected at its front end by means of intermeshing beveled gear wheels 10, 11, with the lower end of the turret shaft 7, while the rear part of this horizontal shaft projects through an opening in the wind shield, and a handle 12 mounted on the rear end of the horizontal shaft and adapted to be manipulated by the driver. It is desirable to lock the turret either in its central or neutral position or when turned toward the right or toward the left, and for this purpose a locking device is provided which is preferably so constructed that the handle 12 forms a part of the same and therefore permits this lock to be operated and the turret to be turned horizontally by the use of the same handle. For this purpose the latter, as shown in Fig. 2, is pivoted at its inner end on a lug 13 projecting laterally from the inner part of the horizontal operating shaft and provided inwardly from its pivot with an arm 14 which projects into the inner end of the operating shaft which is made hollow, as best shown in Figs. 5 and 9. Around the rear bearing of the operating shaft is formed a locking segment 15 which is provided with three notches or locking recesses 16, 17, 18, one of which is arranged on the underside of the operating shaft and the remaining two on horizontally opposite sides of the same, as best shown in Fig. 7.

19 represents a longitudinally movable shifting rod arranged lengthwise in the operating shaft and pivotally connected at its rear end with the inner arm 14 of the hand lever while its front end is provided with a longitudinal slot 20. 21 represents a locking dog having its intermediate part arranged in a longitudinal slot 22 on the underside of the operating shaft and provided at its lower end with a rearwardly-projecting locking nose 23 while its upper end is arranged within the longitudinal slot of the shifting rod and provided on its rear side or edge with a notch 24 which receives that portion of the shifting rod at the rear end of its slot 20, as shown in Fig. 9. A washer 25 is mounted on the shifting rod and bears against the front side of the locking dog and a spring 26 is arranged within the front part of the hollow operating shaft and bears at its rear end against the washer and at its front end against the hub of the bevel gear wheel 10 which is secured to the operating shaft. By this means this spring serves to hold the notch of the dog in engagement with the shifting rod so that these parts are always held in operative engagement with each other and the shifting rod and dog are also yieldingly held in their rearmost position so as to retain the nose of the dog in one or the other of the locking notches 16, 17, 18, of the locking segment. When the signal is in its neutral or central position the nose of the locking dog engages with the lower locking notch 16, as shown in Figs. 2, 7 and 9. When it is desired to turn the turret and the indicator mounted thereon laterally either toward the right or toward the left, the handle 12 is first moved rearwardly so as to disengage the locking dog from the locking segment. Thereafter the handle together with the operating shaft and associated parts is turned either toward the right or toward the left for projecting the indicator toward the corresponding side of the vehicle, after which the handle is released and permitted to move forwardly under the action of the spring 26, so as to engage the dog 15 either with the notch 17 or the notch 18 of the segment and thereby lock the signal either in a position in which the same projects toward the right or toward the left-hand side of the vehicle. For restoring the signal to its normal or neutral position, the dog is again released from the respective side notch of the segment by means of a handle and associated parts, and after the turret has been turned to its central position, the dog is again reëngaged with the central notch of the segment by releasing the handle. It is thus possible by the use of one hand to not only unlock and lock the signal in its proper position but also shift the same toward and from either side of the vehicle, as desired.

Although the indicator which is mounted on the turret so as to turn therewith and capable of being projected and retracted relatively thereto may be variously constructed, that shown in the drawings comprises a hollow body 27 which is provided at its front end with a hand 28 or similar pointer which serves as an indicator during the day time and a lamp 29 arranged within the hollow body adjacent to the front end thereof between windows or openings 30 arranged on horizontally opposite sides of this indicator body so that when this lamp is illuminated it will serve as an indicator during night time. The indicator body inclines forwardly and is normally seated on the upper side of the turret body over the opening in the top of the latter when the signal is in its neutral or central position, as shown in Fig. 9, but when the turret is turned either toward the right or toward the left from its central position, the indicator is projected laterally, as shown in Figs. 3 and 4, from the turret body and when the latter is again returned to its central position the indicator is retracted. The means whereby this projection and retraction of the indicator relatively to the turret is effected, may be variously constructed but those shown in the drawings are preferred and comprise two lazy tongs or series of levers 31, 31, which are arranged side by side, the members of these two lazy-tongs being connected with each other by transverse rods 32 so as to strengthen the same. The outermost pair of levers of each lazy-tong are pivotally connected with the underside of the indicator body while the innermost pair of levers of each lazy-tong are capable of movement toward and from each other for the purpose of causing the lazy-tong to either project or retract the indicator relatively to the turret. In its preferred form, one of the innermost levers 33 of each lazy-tong is pivoted on the rear upper side of the bottom of the turret body and the companion innermost lever 34 is constructed in the form of a fork which projects through a pair of longitudinal slots 35, 35, in the underside of the turret body and is guided thereon by means of a transverse pin or roller 36 moving in a longitudinal track which is formed between the upper side of the turret body bottom and a longitudinal rail 37 secured to this bottom above its upper side, as best shown in Figs. 3, 4 and 9. The sliding front levers 34 of the lazy-tongs may be moved toward and from their companion rear pivoted levers 33 in a variety of ways but this is preferably accomplished in the present instance by means of a rock lever 38 which is pivoted by means of a horizontal transverse pin 39 on the rear ends of the brace bars 8 forming part of the turret, this rock lever being provided with a single rearwardly projecting arm which has a cam-roller 40 working in a cam track 41 on the adjacent part of the base and this rock lever having its front part split or divided so as to form two arms each of which is connected by means of a link 42 with the lower end of the sliding lowermost lever 34 of one of the lazy-tongs, as best shown in Figs. 2, 3, 6 and 9. The cam track 41 has its central part arranged highest and gradually slopes downwardly from this central part toward its opposite ends. When the turret is in its central position, as indicated in Figs. 2 and 9, the cam roller of the cam lever engages with the high central part of the cam track and causes the lazy-tongs to be folded and the indicator to be retracted into its inoperative position. Upon turning the turret either toward the right or toward the left, the cam-roller descends from the central high part of the cam-track toward either of its depressed ends, thereby causing the cam lever to be turned in a direction which will cause the lazy-tongs to be unfolded and the indicator to be projected toward the respective side of the car, as shown in Figs. 3 and 4, and thereby give a warning signal accordingly.

The lamp 29 is preferably an electrically illuminated incandescent bulb, and means are provided whereby the same is automatically lighted when the indicator is projected either toward one side or the other of the vehicle. In the preferred organization this lamp is lighted by means of a dry electric battery 43 which is adapted to be mounted within the hollow body of the indicator into which the same is introduced and also removed when the same is worn out through an opening in the rear end of this body which is normally closed by a lid or door 44 hinged to the rear end of the body. The preferred means of thus mounting the lamp and battery and turning the light on and off are constructed as follows:

A holding frame is provided for the lamp and battery which comprises front and rear heads 45, 46, longitudinal bars 47 connecting these heads, and a lamp socket 48 arranged on the front end or head and adapted to receive the lamp 29, these heads, bars and the socket being constructed of metal and electrically connected with each other. The metallic base 49 of this lamp engages with the metallic socket 48 and forms one terminal of the lamp filament while the central metal contact 50 of the lamp forming the opposite terminal of the filament engages with a central contact pin 51 arranged lengthwise in the socket 48 and is connected at its rear end with a front auxiliary contact 52 which is mounted on the battery and lamp holder but is insulated therefrom. On its opposite sides the heads of the holder are provided with notched guide lugs 53 of insulating material, the notches of which engage with longitudinal guide ribs or rails 54 secured to the upper and lower parts of the inner side of the indicator casing, so that this holder can be slid into and out of the same without forming any electrical connection therewith. The battery which is arranged lengthwise within this frame has a front central terminal which is adapted to engage with the front auxiliary contact 52 and the metallic casing of this battery forms the opposite terminal of the battery and engages at its rear end by means of the spring 55 with a rear main contact 56 which is mounted on a swinging catch 57 arranged at the rear end of the holder. The swinging catch is made of metal and one end of the same is pivoted on one side of the rear holder head and detachably connected on its opposite side therefrom by means of a hook 58, as best shown in Fig. 11. The battery is yieldingly held in its proper position within the holder and the indicator casing by means of a spring 59 interposed between the rear lid of the indicator casing and the catch 57 of the holder but insulated from the latter. When the holder is inserted within the indicator casing, the front head 45 engages with a fixed metallic contact 60 mounted on the inner side of the metallic indicator casing but insulated therefrom and the rear contact 56 engages with a fixed metallic contact 61 mounted on the rear part of this casing but insulated therefrom, as best shown in Fig. 11. 62 represents an intermediate electric contact mounted on the inner side of the indicator casing but insulated therefrom. 63 represents a hand switch which is adapted to connect and disconnect the front fixed contact 60 and the intermediate fixed contact 62 and which is mounted on the adjacent part of the indicator casing but insulated therefrom. 64 represents a rocking switch which is adapted to connect and disconnect the front fixed contact 60 and the intermediate fixed contact 62 and which is mounted on the adjacent part of the indicator casing but insulated therefrom. 64 represents a rocking switch which is adapted to connect and disconnect the intermediate fixed contact 62 and the rear fixed contact 61 and which is mounted on a rock shaft 65 journaled in the adjacent part of the indicating casing. A rocking motion is imparted to this shaft by movement derived from the lazy-tongs as they fold and unfold, and this is preferably effected by providing the outer end of the rock shaft 65 with a rock arm 66 which is connected by means of a link 67 with the uppermost lever of one of the lazy-tongs, as shown in Fig. 3. As the indicator is retracted by the lazy-tongs, the rocking switch contact 64 is automatically turned so as to break the circuit of the battery 43 through the lamp 29 and thereby extinguish the same, and when the indicator is projected by the lazy-tongs, the rocking switch contact 64 is turned so as to connect the rear fixed contact 61 and the intermediate fixed contact 62 and thereby automatically illuminate the lamp when the same is turned toward one side or the other of the vehicle. During day time when the lamp is not required, the electric circuit between the lamp and battery 43 may be broken by shifting the hand switch 63 accordingly.

In the event that the dry battery 43 in the indicator casing becomes exhausted, the illumination of the lamp 29 may be effected by withdrawing current from the storage battery which is now ordinarily found on motor vehicles for the ignition and illuminating system. For this purpose, an auxiliary front contact 68 and an auxiliary rear contact 69 are mounted on the inner side of the indicator casing but insulated therefrom. The auxiliary front contact 68 is engaged with one end of the front holder contact 52 when the holder is pushed into the indicator casing. Two binding posts 70, 71 are mounted on the casing but insulated therefrom, the contact 70 being connected with the intermediate fixed contact 62 and the other 71 being electrically connected with the rear auxiliary contact 69. These binding posts are adapted to be connected with opposite poles of a storage battery on a vehicle or other independent electrical source of supply. Turning with the main rocking contact 64 but insulated therefrom is an auxiliary rocking contact 72 which is adapted to connect and disconnect the auxiliary front and rear contacts 68, 69, and place the lamp in circuit with the storage battery when the indicator is projected and to disconnect the lamp from the storage battery when the indicator is retracted in substantially the same manner in which this is done when the lamp is supplied with current from the dry battery within the indicator casing. By reason of the windows of the indicator being arranged on opposite sides thereof, a single lamp can be employed as a night signal for indicating the direction the vehicle is about to take either on the right hand side or the left hand side of the same.

When this signal is mounted on the vehicle, the same is attractive in appearance and does not require any alteration of the automobile as now commonly made. It can be easily manipulated, it is within convenient reach of the driver and as the same projects laterally from either side of the car, it serves as an effective signal to persons either in front or in rear of the car and also at the side of the same, thereby reducing to a minimum the possibility of accidents.

I claim as my invention:

1. A direction signal for vehicles comprising a turret rotatable about a vertical axis, and an indicator rotatable with said turret and also capable of being projected and retracted relatively thereto.

2. A direction signal for vehicles comprising a turret rotatable about a vertical axis, means for turning said turret comprising a horizontal rock shaft, a handle on said shaft and intermeshing gears arranged on said shaft and turret, and an indicator rotatable with said turret and also capable of being projected and retracted relatively thereto.

3. A direction signal for vehicles comprising a turret rotatable about a vertical axis, an indicator rotatable with said turret and also capable of being projected and retracted relatively thereto, and lazy-tongs connecting said indicator with said turret.

4. A direction signal for vehicles comprising a turret rotatable about a vertical axis, an indicator rotatable with said turret and also capable of being projected and retracted relatively thereto, lazy-tongs connecting said indicator with said turret, and means for folding and unfolding said lazy tongs comprising a relatively fixed cam, and a rock lever having one arm controlled by said cam and its other end operatively connected with said lazy-tongs.

5. A direction signal for vehicles comprising a turret rotatable about a vertical axis, an indicator rotatable with said turret and also capable of being projected and retracted relatively thereto, lazy-tongs connecting said indicator and said turret, and means for folding and unfolding said lazy tongs comprising a relatively fixed cam, and a rock lever having one arm controlled by said cam and its other end operatively connected with said lazy-tongs, the uppermost levers of said lazy-tongs being pivotally connected with said indicator and one of the levers of the lowermost pair of said lazy-tongs being pivoted on the turret and the other slidable on the turret toward and from the pivoted levers.

6. A direction signal for vehicles comprising a turret rotatable about a vertical axis, an indicator mounted on said turret, a shaft operatively connected with said turret, a handle pivoted on said shaft, a fixed segment having a plurality of notches, a shifting rod mounted on said shaft and operatively connected with said handle, a dog mounted on said rod and adapted to engage one or another of said notches, and a spring for shifting said rod and holding said dog yieldingly in engagement with the notches of said segment.

7. A direction signal for vehicles comprising a turret rotatable about a vertical axis, an indicator mounted on said turret, a hollow operating shaft, intermeshing gear wheels connecting said shaft with said turret, a handle pivoted on said shaft and having an inner arm, a shifting rod arranged lengthwise in said shaft and connected with said arm and provided with a longitudinal slot, a dog arranged in said slot of said rod and provided with a notch which receives said rod at the end of its slot, a locking segment having a plurality of notches adapted to be engaged by said dog, and a spring arranged in said shaft and operating to hold said dog in engagement with said rod and said segment.

8. A direction signal for vehicles comprising a support, an indicator having an electric lamp and capable of being projected and retracted relatively to said support, a pair of lazy-tongs connecting said indicator with said support, a switch for making and breaking the circuit of said lamp, a rock shaft mounted on the indicator and carrying said switch, a rock arm on said rock shaft, and a link connecting said arm and lazy-tongs.

9. A direction signal for vehicles comprising a support, an indicator having an electric lamp and capable of being projected and retracted relatively to said support and having a hollow body provided with windows, an electric lamp arranged in said body in line with said windows, a holder slidable lengthwise in said body and supporting said lamp and provided with main and auxiliary contacts forming part of the circuit of said lamp, main contacts mounted on said body and adapted to be engaged by the main contacts of said holder, auxiliary contacts mounted on said body and adapted to be engaged by the auxiliary contacts of said holder, a battery arranged in said holder in circuit with said main contacts, a main switch for opening and closing said circuits, and binding posts connected with said auxiliary contacts for connecting an auxiliary source of electric current with said lamp, means for operating said main switch automatically, and a manually operated switch arranged in said circuits.

CARL FREDRIKSEN.

Copies of this patent may be obtained for five cents each, by addressing the "Commissioner of Patents, Washington, D. C."